Nov. 18, 1952     H. E. PHILLIPS     2,618,245
LIQUID METER
Filed June 28, 1949     2 SHEETS—SHEET 1
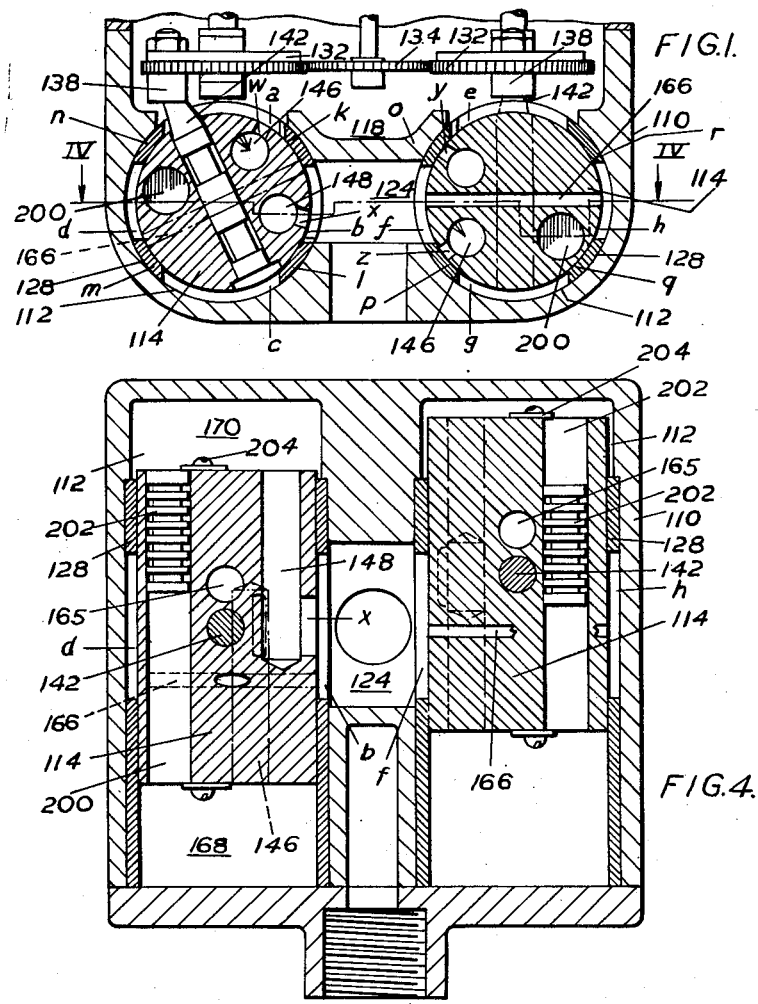
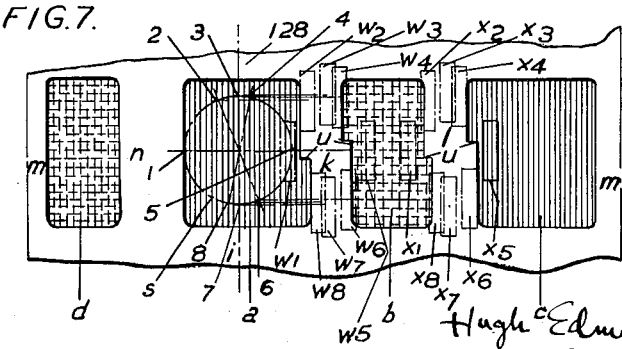

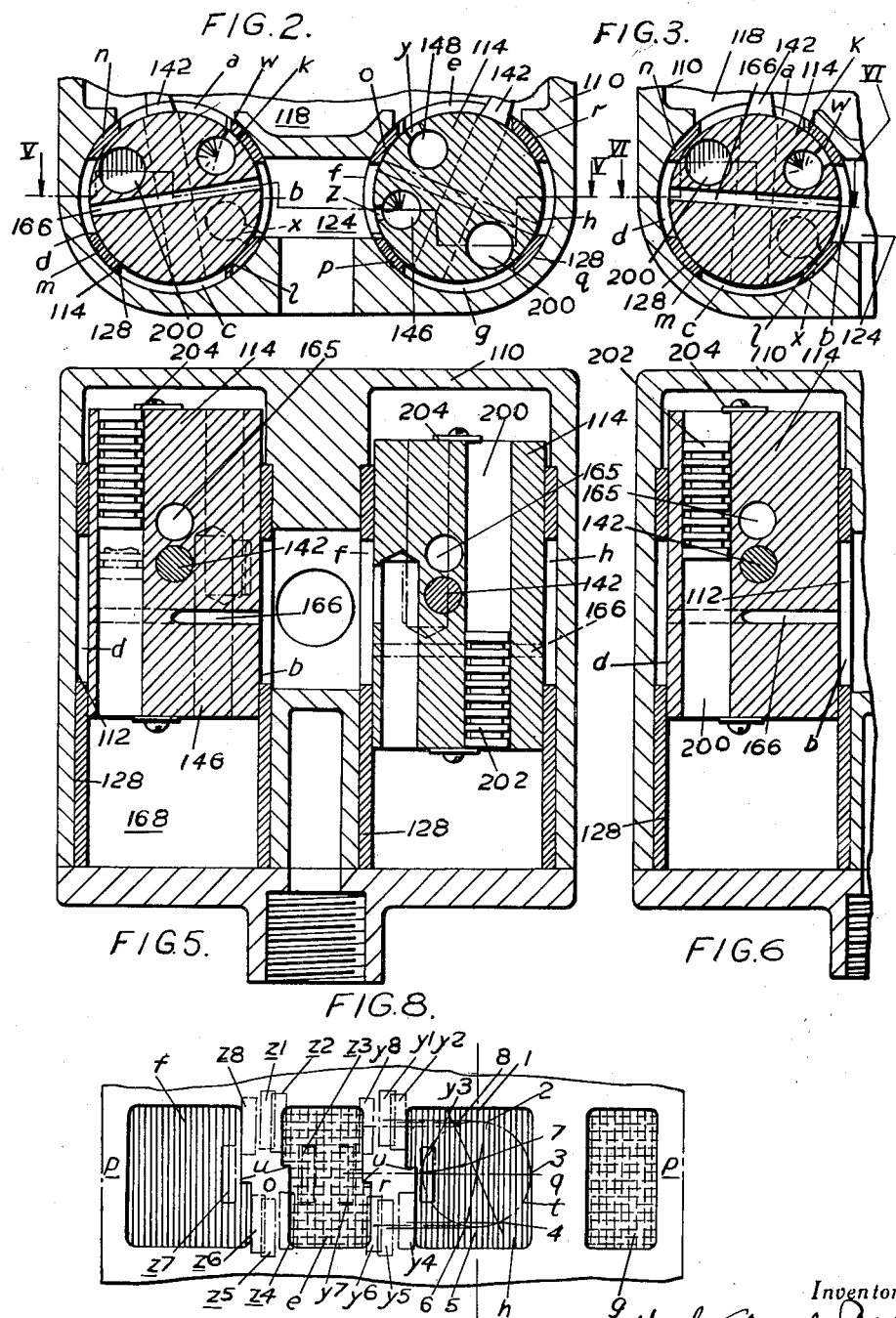

Patented Nov. 18, 1952

2,618,245

UNITED STATES PATENT OFFICE 2,618,245

LIQUID METER

Hugh Edmund Phillips, Streatham Vale, London, England

Application June 28, 1949, Serial No. 101,781
In Great Britain May 5, 1949

3 Claims. (Cl. 121—101)

This invention relates to liquid meters of the kind having pistons which are moved axially under the influence of the supply pressure and are rotated as a consequence of such axial movement.

Meters of that kind comprise a pair of pistons arranged side by side and geared for rotation together. Each piston has a number of axial bores which can be made to communicate with feed or supply and delivery passages through radial passages in the pistons which terminate in openings or ports through which the supply and delivery take place. The bores proceed from the ends of the pistons but have blind ends within the pistons so that when liquid under pressure is passed through a port and its associated bore into the cylinder space at one end of the piston, the piston is moved towards the other end of the cylinder an the liquid in the cylinder space at that end is expelled. The pistons are caused to rotate, or oscillate as a result of their axial movement so that the ports are brought cyclically into communication with the source of supply of the liquid to be metered and with a delivery passage. Both the axial and the rotational movements of the two pistons are out of phase with each other.

At different times during the operation of the meter, the ports are fully covered and fully uncovered by lands which separate the supply circuit from the delivery circuit. At no time, however, must the ports be fully covered longer than momentarily because the pistons are continuously reciprocated and the reciprocation is accompanied by a pumping action which makes it necessary that the liquid should at all times have freedom of movement. Also, no port must at any time be in communication both with the supply circuit and the delivery circuit. Consequently, the machining of the ports and of the lands is a precision operation which makes these meters expensive to manufacture.

The object of the invention is to eliminate this criticality of the size of the ports and lands and thus to simplify and cheapen the cost of manufacture.

To ensure that the ports are never in communication both with the supply circuit and with the delivery circuit is simple as it involves only making the lands larger than the ports. To do so, however, causes the ports to be fully covered for a period depending upon this difference in size. While the ports are fully covered, axial movement of the piston causes pressure to be built up at one end of the piston and rarefaction at the other and this will stop the movement of the piston and, therefore, the functioning of the meter, unless the liquid can leak past the piston, in which case, the metering efficiency is impaired.

According to the invention, means are provided which automatically relieve the pressure and the rarefaction caused by complete covering of the ports, without interfering with the quantity of liquid delivered by the meter.

When such means are provided, the relative size of the lands and the ports is not critical. It is necessary only to ensure that the lands are greater than the ports so that a port cannot be simultaneously in communication with the supply circuit and the delivery circuit. The relative size of the lands and ports will alter the rating of the meter so that the latter has to be calibrated accordingly, but this is of no consequence having regard to the benefit to be derived from its being no longer necessary to match the ports and the lands accurately.

The relieving or compensating means which are provided in accordance with the invention can be of a very simple nature. They preferably consist of a bore which extends through the piston from the supply end to the delivery end having in it a plunger which is a good sliding fit in the bore. When the pressure on one side increases, the plunger is moved in the bore so as to increase the volume of the space occupied by the liquid. Increase of pressure on one side is accompanied by decrease of pressure on the other and the movement of the plunger decreases the volume of the space occupied by the liquid on the latter side.

The arrangement just described is a particular example of the general case in which the two ends of the cylinder are connected by a passage by-passing the piston and containing a movable abutment which may be in the form of a floating piston or plunger or a diaphragm.

The adjustment of the cylinder space at each end effected by the movement of the plunger or other pressure compensating means allows the piston to move in spite of its ports being fully covered. Consequently, the lands can be made substantially larger than the ports and they do not have to be machined to anything like the same degree of accuracy.

During normal delivery, there will be differential pressures on the two ends of the plunger and the plunger will move in its bore. Stops are consequently provided at each end of the piston which limit the movement of the plunger. During delivery, the plunger is against one of its limit stops when the piston is travelling in one direction and against the other stop when the piston is travelling in the other direction.

The delivery port is maintained closed for a period extending from immediately before to immediately after the piston passes through one of its dead centre positions. At the moment of its closing, the plunger is against its limit stop at the delivery end of the piston. When the delivery port has been closed, the pressure on the delivery side increases and the plunger is forced backwards. As the piston passes through the dead centre position i. e. changes its direction of movement, the delivery port being still closed, the pressure on the delivery side decreases and the movement of the plunger is reversed. The port, therefore, must not remain closed after the piston has passed through the dead centre position for a period longer than that during which it remained closed before the dead centre position was reached. To guard against this eventuality, the port is preferably deliberately made to open nearer the instant at which the piston passes the dead centre position than it is made to close.

It will be appreciated that, a delivery port having been closed, on its being re-opened, it becomes a supply port which, after being closed is re-opened as a delivery port. The same considerations as to timing of opening and closing of a supply port as those explained above arise in connection with the delivery port.

In order that the invention may be thoroughly understood and be more readily carried into effect, an example of a meter in accordance with it will now be described with reference to the accompanying drawings in which:

Figs. 1, 2 and 3 are cross sections through the meter showing different phase of its operation.

Figs. 4, 5 and 6 are sections taken respectively on the lines IV—IV, V—V and VI—VI in Figs. 1, 2 and 3 and Figs. 7 and 8 are developments of the two cylinders of the meter showing the positions of the ports relatively to the supply and delivery passages at various instants.

A meter of the kind shown in the drawings has a casing 110 in which are formed two cylinders 112 each housing a piston 114. The cylinders are fitted with liners 128 one having four slots, a, b, c and d and the other four similar slots e, f, g and h. The slots are separated by lands k, l, m and n and o, p, q, r.

The slots a and e communicate with a common supply passage 118; the slots b and f communicate with a common delivery passage 124.

A passage 165 in each piston establishes communication at all times between the slot a and the slot c and between the slot e and the slot g; a similar passage 166 establishes corresponding communication between the slot b and the slot d and between the slot f and the slot h. This ensures that the radial thrusts on the pistons are always balanced.

Each piston has a crank pin 142 which fits in a bearing 138 carried by pinions 132 which mesh with a common pinion 134.

Each piston has two bores 146 and 148 running from opposite ends and terminating in ports w, x, y and z in the peripheral surface of the pistons.

The meter operates as follows:

Considering first the left-hand piston 114 which is shown in Figs. 1 and 4 in its mid-stroke position. Liquid is supplied from the passage 118 through the slot a and the port w into the bore 146. The piston is thereby driven upwards as seen in Fig. 4 and liquid is forced out of the space 170 in the cylinder through the bore 148, the port x and the slot b into the delivery passage 124. In so moving, the piston causes the crank pin 142 to gyrate so that the piston is turned about its axis thus bringing the ports w and x opposite the lands k and l as shown in Figs. 2 and 3.

The right hand piston which is shown in Figs. 1 and 4 at one end of its stroke is also reciprocated and rotated by the pinions 132 and 134. Its reciprocation and rotation are both out of phase with those of the left hand piston. While the ports of the left hand piston are being brought opposite the lands k and l, the ports y and z of the right hand piston are being brought opposite the slots e and f. Liquid is therefore supplied from the passage 118 to the bore 148 in the right hand piston as shown in Fig. 2 and that piston is moved downwards as seen in Fig. 5 and liquid is delivered to the passage 124 through the bore 146.

On reaching the end of its stroke, the left hand piston reverses its direction of movement while the ports w and x move past the lands k and l and opposite the slots b and c. Liquid is then supplied through the passage 165, the slot c and the port x into the bore 148 and liquid is forced out of the cylinder space 168 through the bore 146, the port w and the slot b into the delivery passage 124.

Meanwhile the rotation of the right hand piston is reversed but the axial movement continues downward (Fig. 5) and the ports y and z are again covered by the lands o and p. On reaching the end of its stroke, the right hand piston reverses its direction of movement but its rotation continues so that the ports y and z move past the lands o and p and opposite the slots f and g. Liquid is then supplied through the passage 165, the slot g, the port z to the bore 146 and liquid is delivered through the bore 148, the port y and the slot f to the delivery passage 124.

The left hand piston completes its downward stroke, while the ports w and x are being brought back opposite the lands k and l. During the first half of the upward stroke, the ports w and x are brought past the lands k and l and opposite the slots e and f so that again liquid is delivered through the port x into the passage 124. This completes one cycle of the left hand piston.

At the same time, the right hand piston makes the second half of its upward stroke while the ports y and z are brought past the lands o and p. This completes one cycle of the right hand piston.

At all times, one or the other of the pistons is being driven by the supply pressure and is driving the other through the pinions 134 and 132; at all times also, one or the other of the pistons is delivering liquid through the passage 124.

It will be seen that the ports w, x and y, z are more narrow than the lands k, l and o, p and therefore, that they will be covered by the lands for periods corresponding to the difference in widths. When the ports are completely covered, no liquid can pass through a cylinder but as the pistons are continuously reciprocated, there is a constant pumping action. Ordinarily, the pressure set up at one end of the cylinder would stop the meter from operating and a difference between the widths of the ports and lands is not permissible. Indeed, the ports and lands have to be extremely accurately matched and this leads to a considerable manufacturing cost.

The necessity for such accurate matching is avoided according to the invention by the provision in each piston of a bore 200 running from end to end and containing a plunger 202. When the ports of a piston are completely covered and the piston is moved axially, no liquid is supplied to or withdrawn from the end spaces 168 and 170 in the cylinder although the volume of those spaces is being altered. The surplus liquid at one end and the deficiency at the other end are catered for by movement of the compensating plunger 202 which is subjected to different pressures at its two ends. The piston is, therefore, never subjected to a pressure which cannot be overcome by the supply pressure.

When a piston is delivering liquid, it is subjected to the supply pressure at one end, and the delivery pressure at the other and the compensating plunger 202 will, therefore, be at the end of the piston. In order that it may not be projected beyond the end of the piston, stops 204 are provided at each end of the piston. When, before the end of the stroke the delivery port is closed by a land, the compensating plunger 202 is moved back into a position such as that shown in chain lines on the left hand side of Fig. 5. On reversal of the movement of the piston, the port being still covered, the plunger is moved towards the rear end of the piston. If now the port were to remain covered for a period after the piston had reached its dead centre position longer than that during which it remained covered before that position was reached, the plunger would have to make a greater movement than it had previously made and would be pressed hard against its stop 204 and fail to exert its compensating action. It is therefore deliberately arranged that the lands cover the ports for a shorter period after reversal of the piston than before reversal. This is done by stepping the lands as shown in Figs. 7 and 8.

In those figures, the liners 128 are shown developed. The circles $s$ and $t$ represent the loci of the crank pins 142. The ports $w$, $x$, $y$ and $z$ are shown in the positions they assume in the positions 1–8 of the crank pins and have been marked with corresponding numerals. Thus $w^1$ indicates the position of the port $w$ when the crank pin is in position 1, i. e. in the position shown in Fig. 1; $w^4$ indicates its position when the crank pin is in position 4, i. e. in the position shown in Fig. 3; and so on. The single hatching indicates the existence of communication with the feed circuit; the double hatching indicates communication with the delivery circuit.

The left hand piston reverses in positions 3 and 7 of its crank pin. It will be seen that the lands $k$ and $l$ (or the slots $a$, $b$, and $c$) are stepped at $u$ so that the port $w$ is cut off from the supply in position 2 of the crank pin and is opened to delivery in position 4. Position 2 is further from the "dead-centre" or reversal position 3 than is position 4. Similarly, position 8 is nearer the "dead-centre" position 7 than is position 6. As explained above, this ensures that the plunger 202 is always effective.

It will be noted also, that the port $w$ shut off from communication with the feed circuit (position $w^2$) a little sooner than the port $x$ is shut off from communication with the delivery circuit (position $x^2$). The same applies to the ports $y$ and $z$. If the opposite occurred, that is to say, communication with the delivery circuit were cut off before communication with the feed circuit had been cut off, an undesirable pressure would be built up in the cylinder space 170 (Fig. 4) before the plunger 202 could operate to relieve the pressure. A pulse would, therefore, be set up in the liquid circuit. This can be avoided by ensuring simultaneous cutting-off of the communication with the feed and delivery circuits. Such a measure calls for very accurate machining but is not an essential one and is avoided by the provision of the compensating plunger and by deliberately causing the communication with the feed circuit to be cut off first. The time lag between the two cutting-off operations is not very material.

As already stated, the invention has the advantage of a great simplification in the manufacture of the meter as it makes the forming of the supply and delivery slots a straight-forward machining operation requiring only ordinary good class tolerances instead of a high precision operation. It also eradicates a fundamental fault in meters of this kind which, in order that they might work at all, have previously necessarily had to provide some degree of leakage past the pistons.

The compensating plunger must be a good practically leak-proof fit. The expedient used to provide such a fit will depend upon the liquid being metered. Greater precautions must, of course, be taken when metering thin liquids of high penetrative power such as petrol than when metering thick liquids such as lubricating oil. In general, it is not necessary to take elaborate precautions, a number of sealing grooves being adequate.

I claim:

1. A liquid meter comprising a pair of cylinders each having an inlet port and an outlet port in its periphery, a piston in each cylinder having an inlet port and an outlet port in its periphery and passages leading from said ports to opposite ends of the piston whereby liquid supplied through the inlet port in one of said cylinders into the inlet port of the associated piston will cause said piston to be moved axially in said cylinder, means interconnecting and causing said pistons to rotate as a consequence of their axial displacement and thereby to bring the inlet and outlet ports in each piston successively into and out of communication with the inlet and outlet ports in the associated cylinder, said ports being so relatively disposed that there is a period during which the inlet and outlet ports in each piston are simultaneously sealed against communication with the inlet and outlet ports in the associated cylinder, each of said pistons having a passage extending from end to end thereof and out of communication with the ports in said pistons, a plunger in each passage freely movable therein under the influence of the fluid pressures acting on the ends of the pistons consequent upon said simultaneous sealing of said inlet and outlet ports and continued axial displacement of the associated piston, each of said pistons also having stops positioned so as to provide complete freedom of movement of said plunger during said period of simultaneous sealing of said ports but effective to limit said movement at other times.

2. A liquid meter as claimed in claim 1 in which said ports are so relatively disposed that said period of simultaneous sealing of said inlet and outlet ports persists while the direction of axial movement of the piston changes and said period starts at an instant which precedes that at which said change takes place by a greater interval of time than the interval by which the instant at which said period ends follows said instant of change.

3. A liquid meter comprising a pair of cylinders each having an inlet port and an outlet port in its periphery, a piston in each cylinder having an inlet port and an outlet port in its periphery and passages leading from said ports to opposite ends of the piston whereby liquid supplied through the inlet port in one of said cylinders into the inlet port of the associated piston will cause said piston to be moved axially in said cylinder, means causing said pistons to rotate as a consequence of their axial displacement and thereby to bring the inlet and outlet ports in each piston successively into and out of communication with the inlet and outlet ports in the associated cylinder, said ports being so relatively disposed that there is a period during which the inlet and outlet ports in each piston are simultaneously sealed against communication with the inlet and outlet ports in the associated cylinder, a passage in each of said pistons extending from end to end thereof and out of communication with said ports in the pistons and a plunger in each passage freely movable therein under the influence of the fluid pressures acting on the ends of the pistons, said ports being so relatively disposed that said period of simultaneous sealing of said inlet and outlet ports persists while the direction of axial movement of the piston changes and starts at an instant which precedes that at which said change takes place by a greater interval of time than the interval by which the instant at which said period ends follows said instant of change.

HUGH EDMUND PHILLIPS.

REFERENCES CITED

The following references are of record in the file of this patent:

UNITED STATES PATENTS

| Number | Name | Date |
|---|---|---|
| 1,885,517 | Fraser | Nov. 1, 1932 |
| 1,895,318 | Granberg | Jan. 24, 1933 |
| 1,949,006 | Brubaker | Feb. 27, 1934 |
| 2,042,767 | Brubaker | June 2, 1936 |
| 2,399,316 | Berck | Apr. 30, 1946 |